United States Patent
Weimer

(10) Patent No.: US 9,424,226 B1
(45) Date of Patent: Aug. 23, 2016

(54) METHOD AND SYSTEM FOR SIGNAL EQUALIZATION IN COMMUNICATION BETWEEN COMPUTING DEVICES

(71) Applicant: QLOGIC, Corporation, Aliso Viejo, CA (US)

(72) Inventor: Ronald A. Weimer, Laguna Hills, CA (US)

(73) Assignee: QLOGIC, Corporation, Aliso Viejo, CA (US)

(*) Notice: Subject to any disclaimer, the term of this patent is extended or adjusted under 35 U.S.C. 154(b) by 386 days.

(21) Appl. No.: 14/062,418

(22) Filed: Oct. 24, 2013

Related U.S. Application Data

(60) Provisional application No. 61/718,597, filed on Oct. 25, 2012.

(51) Int. Cl.
*H03H 7/40* (2006.01)
*G06F 13/42* (2006.01)

(52) U.S. Cl.
CPC .................. *G06F 13/4286* (2013.01)

(58) Field of Classification Search
USPC ...................... 375/233, 229, 239; 710/315, 72
See application file for complete search history.

(56) References Cited

U.S. PATENT DOCUMENTS

| | | | | |
|---|---|---|---|---|
| 7,561,619 B2 * | 7/2009 | Asuri | ................. | H03H 21/0012 375/229 |
| 8,010,809 B1 * | 8/2011 | Shah | ..................... | H04L 9/0822 380/281 |
| 8,065,454 B1 * | 11/2011 | Sonksen | ............... | G06F 13/385 710/10 |
| 2005/0025229 A1 * | 2/2005 | Jones | ................. | H04L 25/03343 375/232 |
| 2005/0201454 A1 * | 9/2005 | Chaudhuri | ........ | H04L 25/03343 375/229 |
| 2007/0071083 A1 * | 3/2007 | Canagasaby | ........ | H04L 25/0276 375/229 |
| 2012/0102245 A1 * | 4/2012 | Gole | ..................... | G06F 13/385 710/72 |
| 2014/0098844 A1 * | 4/2014 | Mobin | .................... | H04B 1/40 375/219 |

OTHER PUBLICATIONS

PCI Express Base Specification Revision 3.0, Nov. 10, 2010.*
PCI Express 3.0 Equalization: The Mystery Unsolved, Apr. 24, 2012.*
"PCI Express Base Specification Revision 3.0", *PCI-SIG*, (Nov. 10, 2010).
Kumar, et al., "PCI Express 3.0 Equalization: The Mystery Unsolved", *Logic Fruit Technologies*, White Paper.

* cited by examiner

*Primary Examiner* — Paul R Myers
(74) *Attorney, Agent, or Firm* — Klein, O'Neill & Singh, LLP

(57) ABSTRACT

Method and system for performing an equalization process between a remote PCI (Peripheral Component Interface)-Express device and a local PCI-Express device are provided. The use of a forced coefficient in a third phase of the equalization process is enabled. When the remote PCI-Express has made a preset request, then the local PCI-Express device sends the preset request back to the remote PCI-Express device with the forced coefficient.

20 Claims, 6 Drawing Sheets

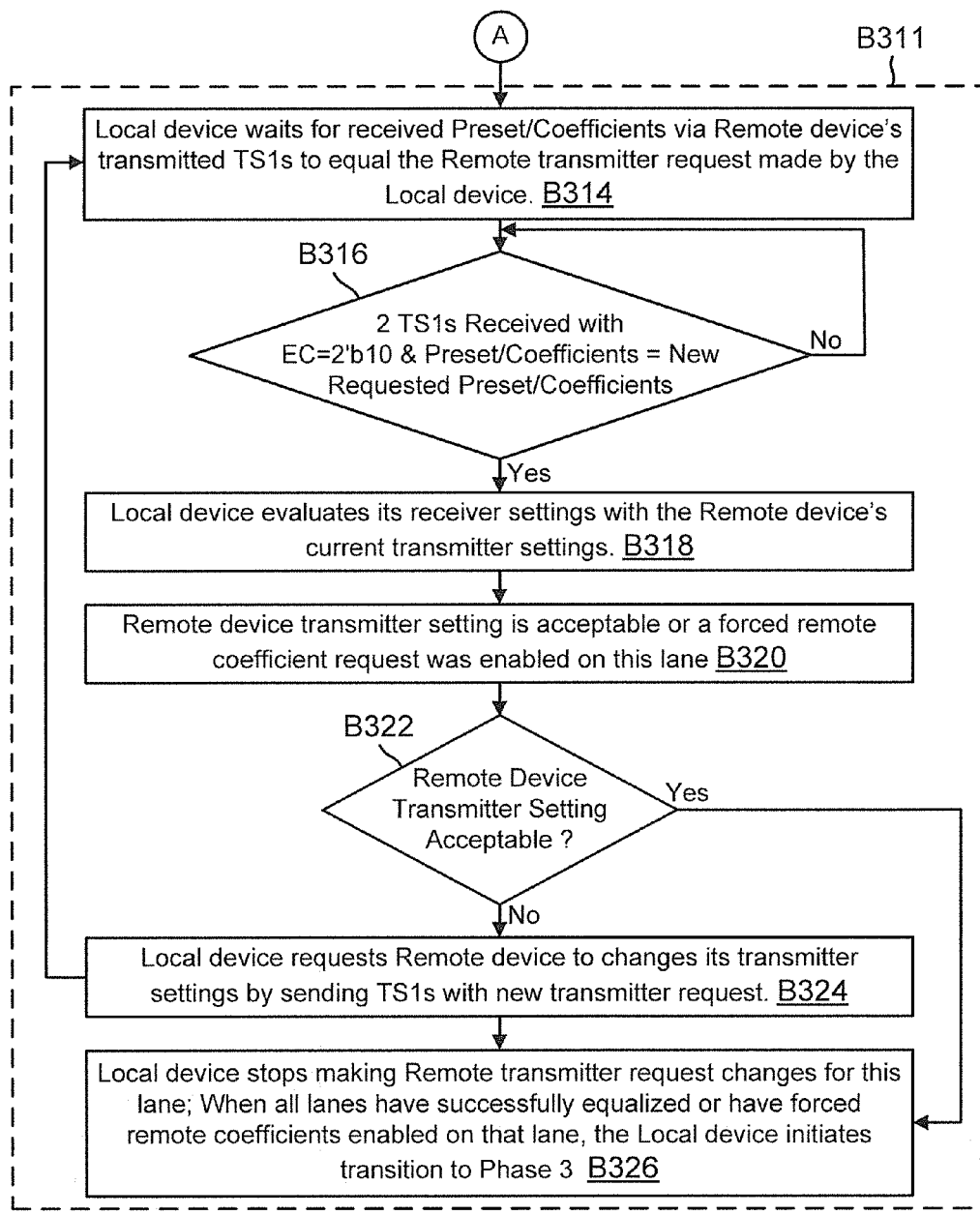
FIG. 3B    FIG. 3    FIG. 3A / FIG. 3B

METHOD AND SYSTEM FOR SIGNAL EQUALIZATION IN COMMUNICATION BETWEEN COMPUTING DEVICES

CROSS-REFERENCE TO RELATED APPLICATIONS

This patent application claims priority under 35 USC §119 (e) based on the provisional patent application Ser. No. 61/718,597 filed on Oct. 25, 2012, the disclosure of which is incorporated herein by reference in its entirety.

TECHNICAL FIELD

The present invention relates to communication between computing devices.

BACKGROUND

Computing systems are commonly used today. A computing system often uses devices such as adapters, network interface cards, host bus adapters and others to send and receive information from other devices. Different protocols may be used by such devices to communicate, for example, Peripheral Component Interface (PCI), PCI-Express (PCIe) and others. Such devices may be referred to as PCI-Express devices.

PCI-Express Gen 3.0 is a third generation standard that is being used for communication between PCI-Express devices across the same copper channel that was used for PCI-Express Gen 2.0 (i.e. second generation). PCI-Express channels are band-limited and may provide large signal attenuation at higher frequencies (for example, 22 dB at 4 Ghz). The high frequency component of PCI-Express signal gets diminished while passing a band-limited channel. This may result in distortion and bit errors at a receiver of a PCI-Express device.

The PCI Express standard has introduced an equalization process for communicating PCI-Express devices to reduce signal distortion. Typically, two communicating PCI-Express devices (may be referred to as a remote device and a local device) have a transmit segment to send information and a receive segment to receive information. The transmit segment may be called a transmitter and the receive segment may be called a receiver.

Equalization is a process of dynamically adjusting transmitter settings on a local and remote PCI-Express device to obtain stable signal communication. During equalization, a signal is passed through a filter having its frequency response equal to an inverse of frequency response of the communication channel. A high gain is applied at higher frequency to counter signal attenuation. Equalization involves using an adaptive filter with coefficients.

Per the PCI-Express standard, equalization at a transmitter segment of a device is based on multiplying a signal with three different filter coefficients and then adding the multiplied output. The PCI-Express specification defines two parameters, Full Swing (FS) and Low Frequency (LF) to specify transmitter voltage characteristics. FS indicates a maximum differential voltage that is generated by a transmitter, while LF indicates the minimum voltage. The specification also specifies pre-defined set of values for the three coefficients, which are referred to as "Presets".

Equalization at PCI-Express devices is managed by state machines having a plurality of states. When equalization is requested by a remote PCI-Express device, an equalization state machine at the remote device transitions through a "Recovery.RcvrLock" sub state. During this sub-state, the remote and local PCI-Express devices send training symbols (TS1). Thereafter, state machines at the remote and local PCI-Express devices transition to a next state referred to as "Recovery.RcvrCfg" state, when the local PCI-Express device sends equalization TS2 training symbols with the Preset values. Details of the various states are provided by the PCI-Express specification. The TS1 and TS2 symbols are also defined by the specification.

PCI-Express provides four phases for equalization, referred to herein as Phase 0, 1, 2 and 3. During Phase 0, the remote PCI-Express device transmits TS1 and Preset values to the local PCI-Express device, while maintaining initial TS2 values. During Phase 1, the remote PCI-Express device and local PCI-Express device advertise their FS and LF values and exchange TS1 ordered sets. The local PCI-Express device first transmits TS1 ordered sets using Preset values for equalization. The remote PCI-Express device then transitions into Phase 1 and sends Preset values. After receiving the values, the local PCI-Express device enters Phase 2.

During Phase 2, the remote PCI-Express device assists the local device to fine tune the Preset/Coefficient values. The local PCI-Express device transmits TS1 ordered sets. The Preset/Coefficient values remain the same, until changed by the remote PCI-Express device. In Phase 3, the local PCI-Express device sends Preset/Coefficient values to the remote PCI-Express device to fine tune its equalization settings.

The PCI-Express standard equalization process based on Presets/Coefficients may not be adequate for Gen 3.0 speeds due to signal degradation. Continuous efforts are being made to improve signal quality for complying with Gen 3.0 operational speeds.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1:
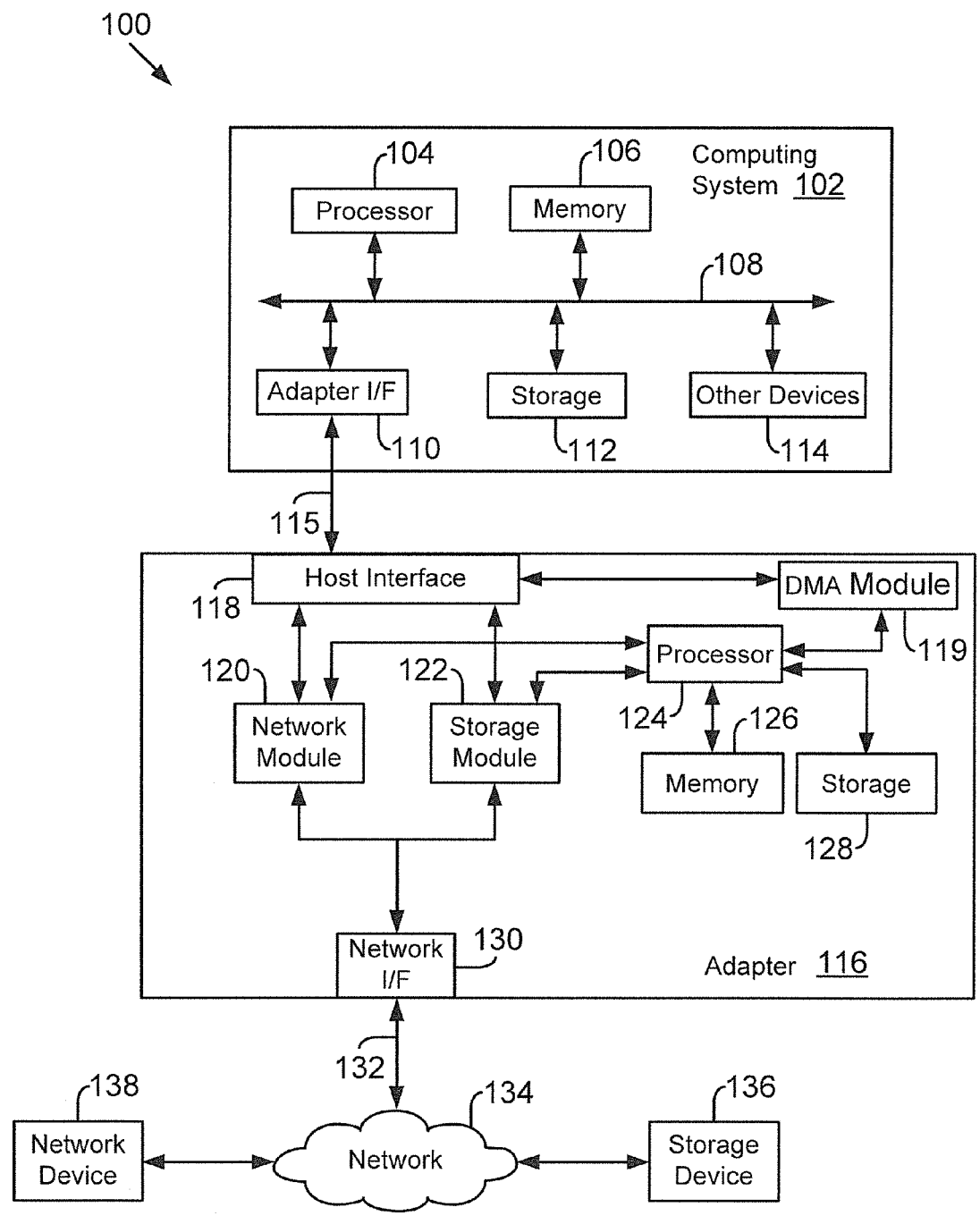
FIG. 1 is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry) or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs).

The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

The following definitions are provided as they are typically (but not exclusively) used in the PCI Express environment, implementing the various adaptive aspects of the present disclosure:

"Coefficients" means filter coefficients used for equalization. Coefficients include a "PreCursor", "Cursor", and a "Post Cursor" value for signal adjustments at the center of the data bit.

"EQ TS2 Preset" is an equalization (EQ) Preset value that is sent by a remote PCI-Express device in the training ordered set 2 at 2.5 GT/s data rate. This Preset value is used to setup a transmitter at an initial entry to a 8 GT/s data rate for PCI-Express Gen 3.0.

"Equalization" is a process of dynamically adjusting a transmitter's settings on a local and remote device to obtain a stable communications link.

"Phase 2" is one of the phases of the equalization process. A local PCI-Express device (for example, an adapter port) requests a remote PCI-Express device (for example, a PCI-Express device port at a host computing system) to change its transmitter settings until a received signal quality is sufficient.

"Phase 3" is also one of the phases of the equalization process. The remote PCI-express device requests a local PCI-Express device to change its transmitter settings until a received signal quality is sufficient.

"PostCursor" represents signal adjustments at the end of a data bit.

"PreCursor" represents signal adjustments at the beginning of a data bit.

"Preset" is a defined transmitter setting that a device can be requested to use. The Preset corresponds to a specific coefficient triplet for a transmitter implementation. The local and remote transmitters may have different coefficients for a specific Preset.

"TS1" means Training Ordered Set 1. TS1 fields within this ordered set are used during the equalization process to send equalization requests to one device and to return status of the request. These fields are Preset, PreCursor, Cursor, and PostCursor.

"TS2" means Training Ordered Set 2.

System 100:

FIG. 1 is a block diagram of a system 100 configured for use with the present embodiments. The system 100 may include one or more computing system 102 (may also be referred to as "host system 102") coupled to another device via a link 115, for example, an adapter 116 that interfaces with a network 134. The network 134 may include, for example, additional computing systems, servers, storage systems and others. It is noteworthy that although the description below is based on the interaction between adapter 116 and host system 102, the embodiments disclosed herein are not limited to any particular adapter type or device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 interfaces with the adapter 116 via the link 115 for sending and receiving information. Link 115 may be an interconnect system, for example, a PCIe link. The adapter interface 110 may be referred to as a remote device when it interfaces with a host interface 118, as described below in detail. Adapter interface 110 includes a transmitter and a receiver for sending and receiving information via link 115. The adapter interface 110 and host interface 118 perform an equalization process described below in detail.

The computing system 102 also includes other devices and interfaces 114, which may include a display device interface, a keyboard interface, a pointing device interface and others. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1, the adapter 116 may be configured to handle both network and storage traffic. Various network and storage protocols may be used to handle network and storage traffic.

Adapter 116 interfaces with the computing system 102 via the link 115 and a host interface (or local device) 118. In one embodiment, the host interface 118 may be a PCI Express interface having logic/circuitry for sending and receiving PCI-Express packets. Host interface 118 communicates with adapter interface 110 and performs equalization, as described below in more detail.

The adapter 116 may also include a processor 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 122 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels for transferring data via link 115. The DMA channels are typically used to move control structures such as input/output control blocks (IOCBs), input/output status blocks (IOSBs) and data between host system memory 106 and the adapter memory 126.

Figure 2:
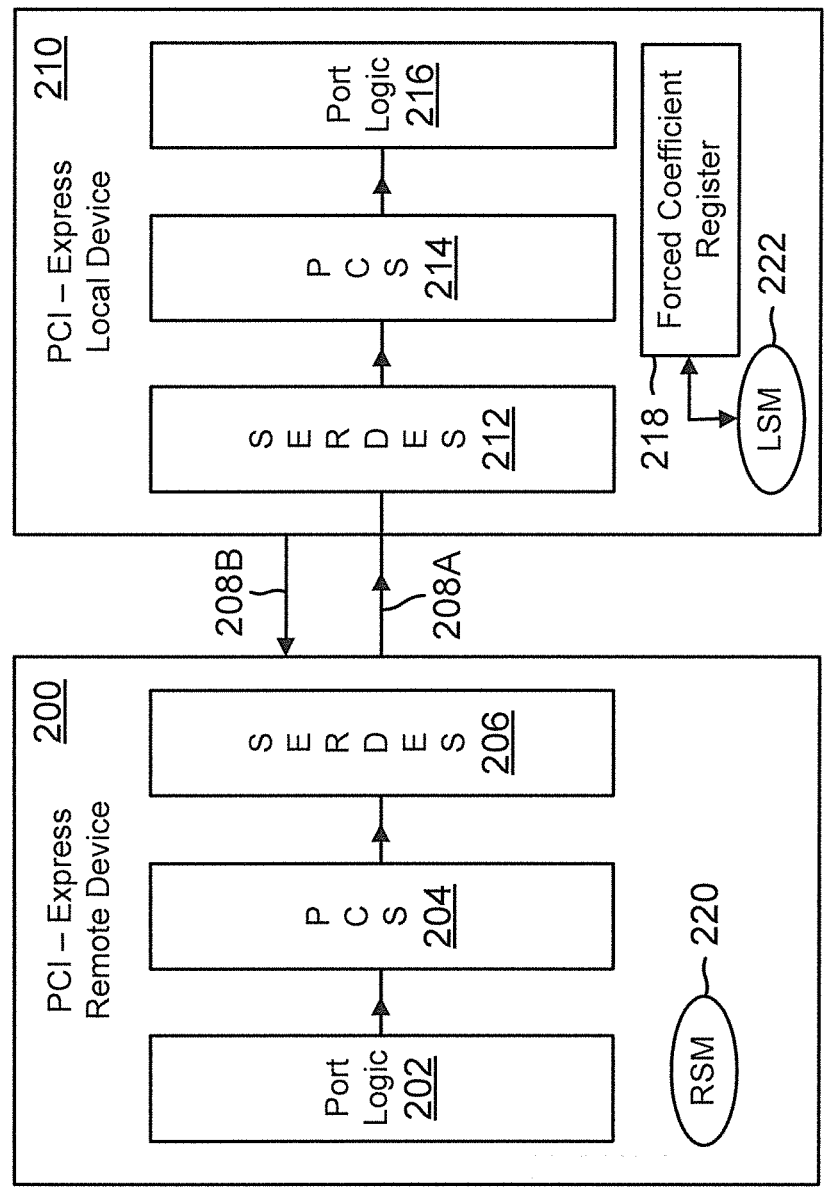
FIG. 2 shows two PCI-Express devices communicating with each other.

PCI-Express Communication:

FIG. 2 shows a block diagram of a remote PCI-Express device 200 communicating with a local device 210 via link 115. The remote device 200 may be the adapter interface 110 or at the adapter interface 110, while the local device 210 may be the host interface 118 or at the host interface 118. Both the remote and the local devices include transmitters and receivers, i.e. a transmit segment to transmit information and a receive segment to receive information. Link 115 may include 1, 4, 8 or 16 PCI-Express lanes for sending and receiving information.

Remote device 200 includes a serial/de-serializer (SERDES) 206, a physical coding layer (PCS) 204 and port logic 202. Local device 210 includes SERDES 212, PCS 214 and port logic 216. Serial data 208A is received at SERDES 212 and then decoded by PCS 214. The decoded data is provided to port logic 216 for further processing. SERDES 206, PCS 204 and port logic 202 perform similar functions for data 208B received from local device 210.

The remote device 220 includes a remote state machine (RSM) 220 for managing equalization for the remote device 200. Local device 210 includes a local state machine (LSM) 222 for managing the equalization process for local device 210. It is noteworthy that the remote device 200 and the local device 210 may each may have one state machine for a receiver and another state machine for a transmitter.

LSM 222 may use forced coefficients that may be stored at a forced coefficient register 218 located at the local device 210. The forced coefficients may be determined during adapter 116 testing and development. The forced coefficients are different from the standard Presets/Coefficients that are typically used for the equalization process. The use of forced coefficients may be enabled or disabled by a configuration setting that is set at a configuration register (not shown) of both the remote and the local device or any other location. Before describing the equalization processes of the current embodiments, the following describes the forced coefficients, according to one embodiment.

Forced Local Coefficients: In one embodiment, when EQ TS2 Presets are used to setup a transmitter (for example, a transmitter at the local device 210), it can override that value with a pre-chosen set of coefficients (PreCursor, Cursor and PostCursor) individually on each PCI-Express lane obtained from the forced coefficient register 218. This includes EQ TS2 Preset setup for an initial autonomous equalization as well as redoing equalization after link 115 is up while running at Gen 3.0 operating rates. The Gen 3.0 rates are specified by the PCI-Express standard. If Phase 2 and Phase 3 of equalization are skipped, then these values become previously negotiated transmitter settings.

During Phase 3, the embodiments described herein override remote device 200 setting requests for the local device for each PCI-Express lane. Instead, the local device 210 uses the forced coefficients to setup its transmitter while reflecting the requested settings in transmitted TS1s. This assumes that the forced value has been properly selected so that the link partner (i.e. remote device 200) will pass Phase 3 successfully.

In one embodiment, the equalization process overrides any previously negotiated transmitter settings when a speed change is made from non-Gen 3.0 to Gen 3.0 and apply forced coefficients individually on each lane. When the force coefficients are enabled on a lane, the values reflected in transmitted TS1s will be the previously negotiated values.

Forced Remote Coefficients: In one embodiment, equalization at the remote device 200 is executed at the optional Phase 2. Otherwise, the remote device 200 will use its default transmitter settings. In Phase 2, local device 210 requests remote device 200 to change its transmitter settings to either the value determined by a receiver evaluation or by the forced remote coefficient obtained from the register 218, if enabled. Again this may be performed on an individual lane basis in which one lane could go through the complete negotiation process while another lane could be using the forced remote coefficients.

Figure 3A:
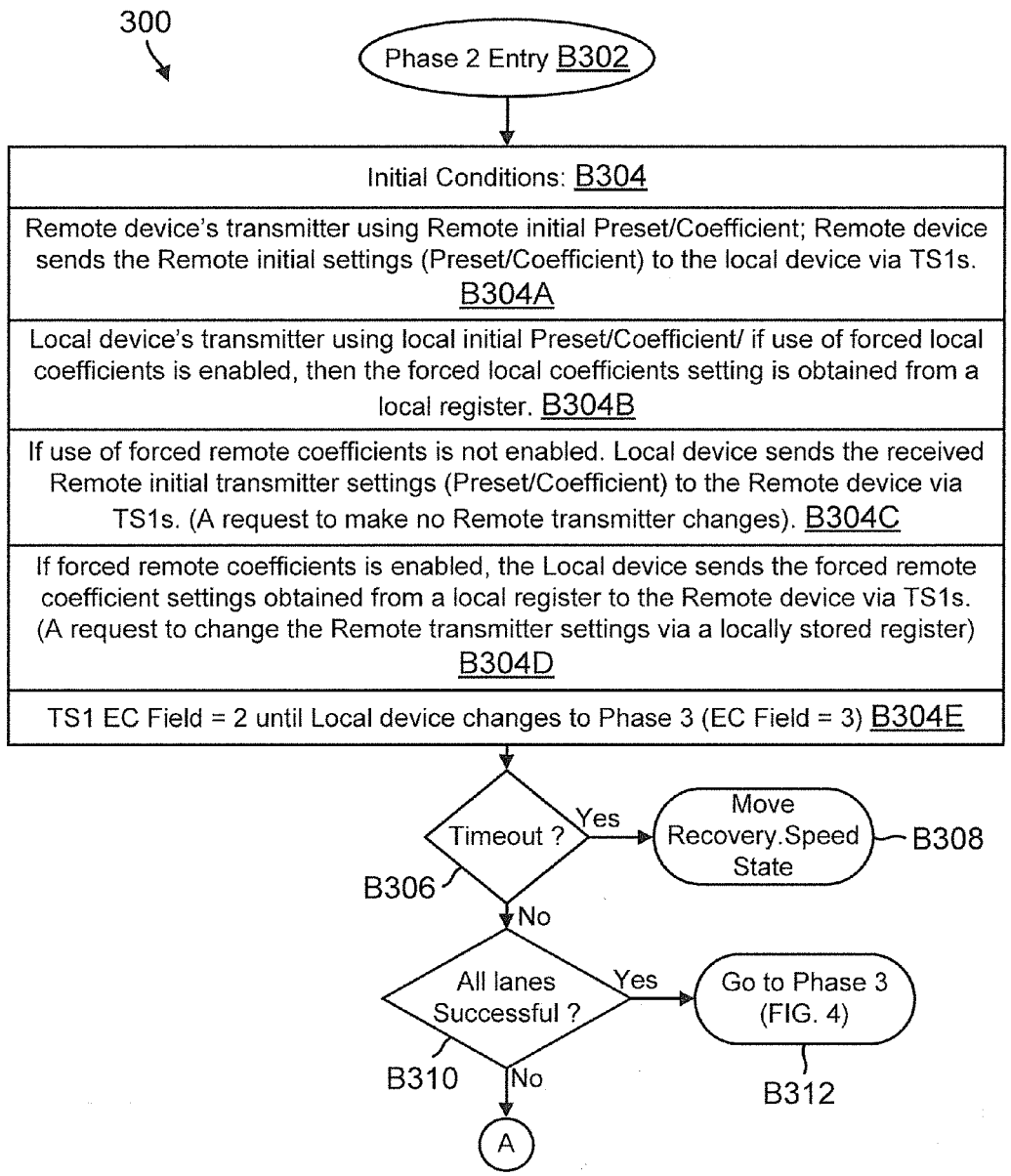
FIGS. 3-4 show equalization process flows, according to one embodiment.

Process Flows:

FIG. 3 shows a process 300 for a Phase 2 equalization process, according to one embodiment. The process may be executed on one or more PCI-Express lanes. The number of lanes for the equalization may vary, for example, 1, 4, 8 or 16. The process begins in block B302, when equalization (or an equalization state machine (for example, 220/222) that controls equalization) enters Phase 2. The various initial conditions for this phase are listed in block B304 as B304A-B304E.

Block B304A illustrates one initial condition where the remote device 200 transmitter uses initial Preset/Coefficient and sends the initial Present/Coefficients to the local device 210 via TS1s.

Block B304B illustrates the initial condition where the local device 210 may use Preset/Coefficients and if enabled forced coefficients. The forced coefficients are obtained when the use of forced coefficients are enabled on a lane.

Block B304C, if forced coefficients are not enabled, then the local device 210 sends the coefficients that it received from the remote device 200 via TS1s.

If forced coefficients are enabled, then the local device 210 sends the forced coefficients in block B304D. In block B304E, the TS1 EC field is set to 2 until the local device 210 moves to Phase 3 (i.e. EC=3) that is described below with respect to FIG. 4. The EC field means Equalization Control field that is specified by the PCI-Express standard and indicates a change in phase.

In block B306, the process (or the state machine 220) determines if a timeout has been reached. The timeout is based on a standard duration that is maintained by both the remote and local devices for completing equalization. If the timeout has been reached, then in block B308, the state machine 220 enters the "Recovery.Speed" sub-state, where both the devices transmit EIOS OS (ordered set) and then enter an Idle state.

If a timeout has not occurred, then in block B310, the process determines if all the PCI-Express lanes have been successfully equalized. If yes, then in block B312, the process moves to Phase 3 that is described below with respect to FIG. 4.

If all the lanes have not been successfully equalized, the process moves to block B311 that may be aborted after a timeout occurs, for example, 24 milliseconds or if all lanes are successfully equalized. Process block B311 includes blocks B314-B326 that are now described in detail.

In block B314, the local device 210 waits for Presets/Coefficients from the remote device 200 such that the local device 210 transmitter equals the remote device transmitter settings.

In block B316, the process (or state machine 222) determines if two TS1s are received with new Preset/Coefficients and with the EC field set to 2 for indicating that the process is still in phase 2. If not, then the process loops back. If yes, then in block B318, the local device 210 evaluates the settings of its receiver compared to the current transmitter settings of the remote device 200.

In block B320, the state machine 222 determines if the remote device transmitter settings are acceptable or if a "forced remote coefficient request" was enabled on the lane that is being equalized.

In block B322, the state machine 222 determines if the remote device transmitter settings are acceptable. If yes, the process moves to block B326 that is described below. If not, then in block B324, the local device 210 requests the remote device 200 to change its transmitter settings by sending TS1s with the request.

Figure 4A:
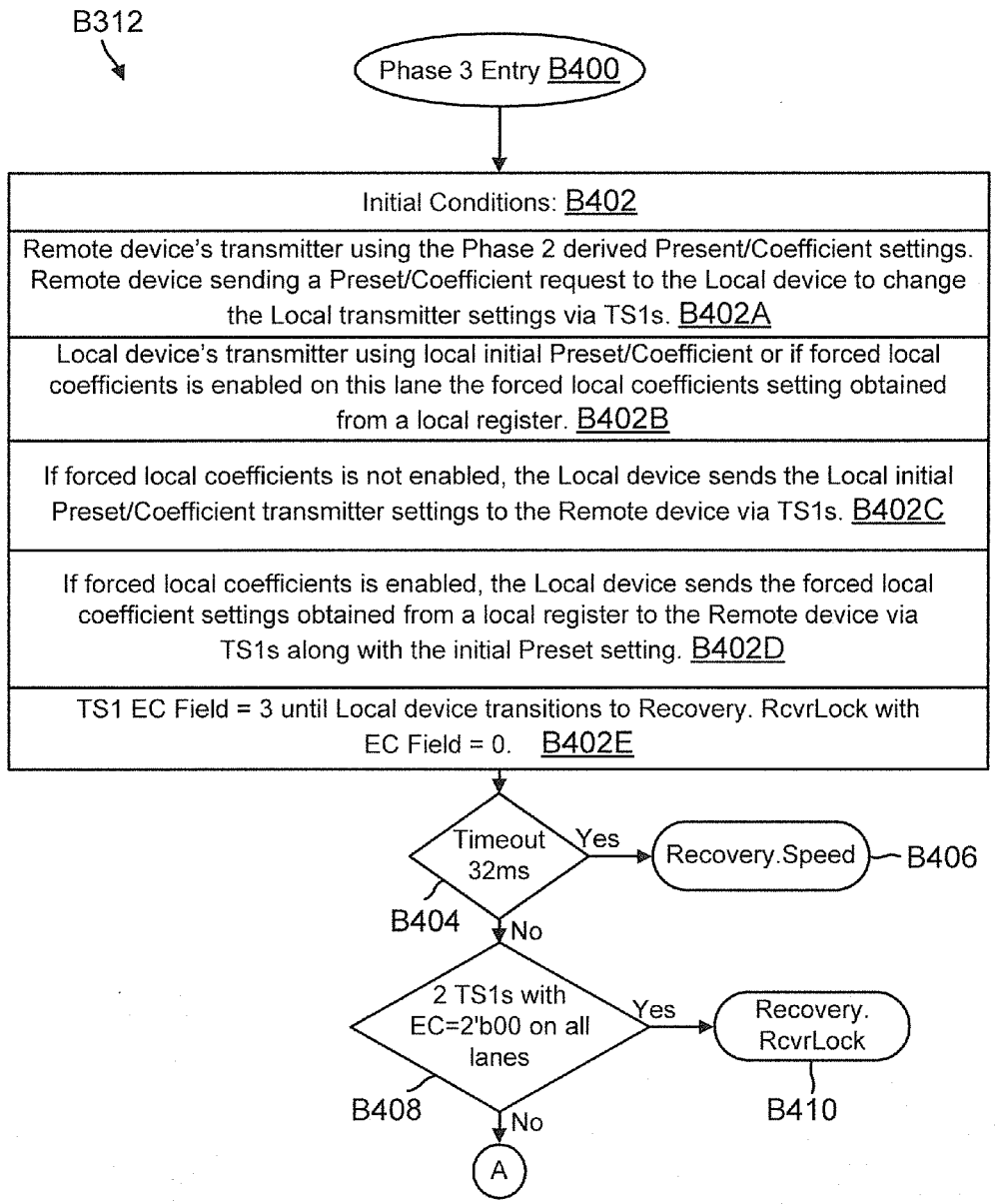
Figures 4, 4A, 4B:
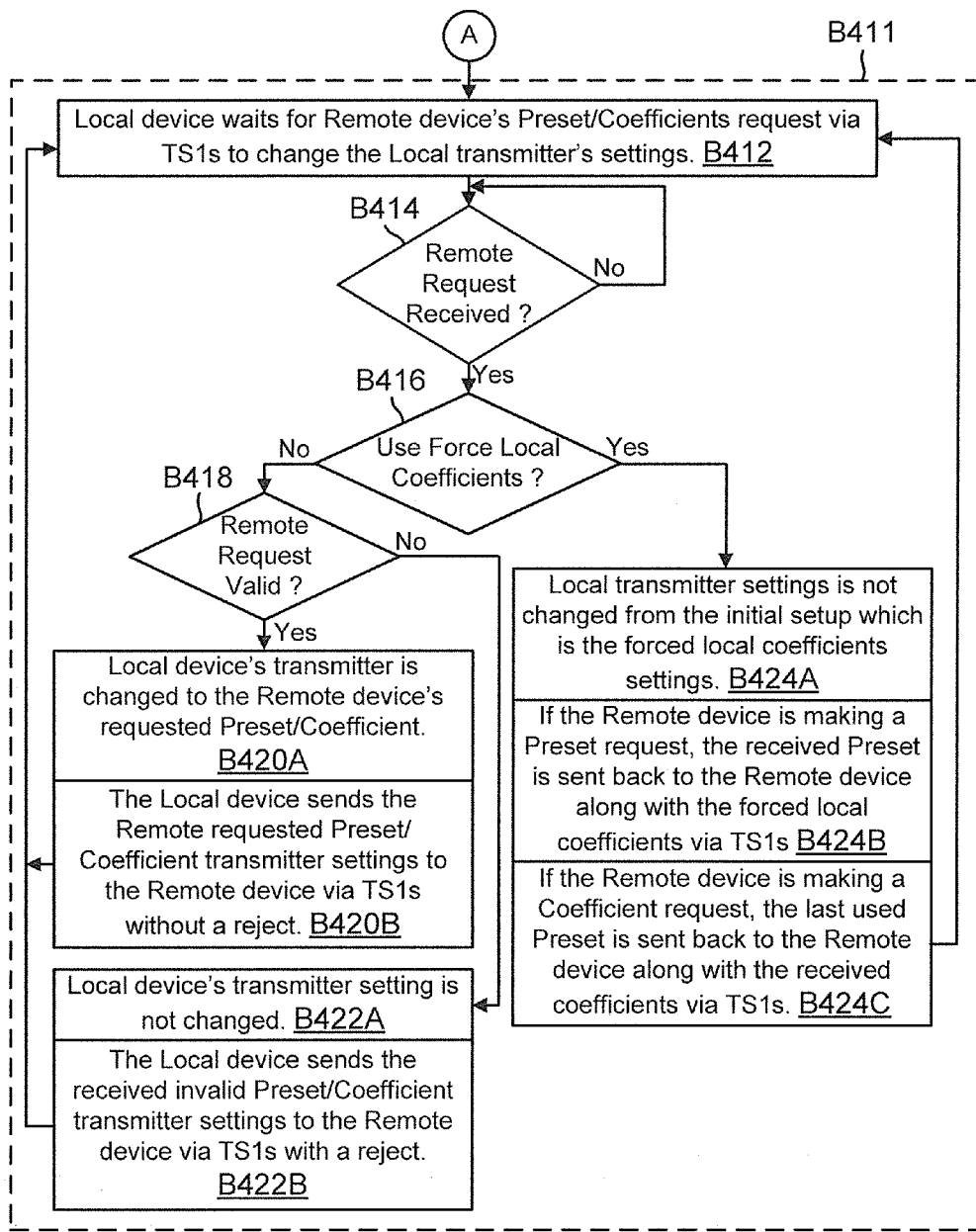

In block B326, the local device 210 stops making remote transmitter request changes for the lane, when all the lanes have successfully equalized or have forced remote coefficients enabled, then the local device 210 initiates transition to Phase 3 that is now described with respect to FIG. 4 below.

Phase 3 begins in block B400 with various initial conditions that are described in blocks B402A-B402E of B402. For example, block B402A illustrates that the remote device 200 is using Phase 2 derived Preset/Coefficient settings. Remote device 200 sends a request to change local device 210 transmitter settings via TS1s.

Block B402B illustrates that the local device 210 may be using initial Preset/Coefficient or if forced local coefficients are enabled then obtaining the forced local coefficients from register 218.

Block B402C illustrates that if forced coefficient use is not enabled, then the local device 210 sends initial Preset/Coefficients to the remote device 220.

Block B402D illustrates that if the use of forced coefficients is enabled, then the local device 210 sends the forced coefficients with the initial Preset settings. In block B402E, a TS1 field value is set to 3, indicating Phase 3 until the local device 210 enters the Recovery.RcvrLock state when the EC field is changed to 0.

In block B404, the state machine 222 determines if a timeout has occurred. The timeout may be based on a standard 32 milliseconds value. If yes, then the state machines 220 and 222 enter the Recovery.Speed state in block B406. If timeout has not occurred, then in block B408, the process determines if there are two Ts1s with EC=2'b00 on all lanes. This indicates that equalization is complete. If yes, then in block B410, the state machines 220 and 222 enter the Reciver.RcvrLock state in block B410. Otherwise, the process moves to block B411 that includes blocks B412-B424C, described in detail below.

In block B412, the local device 210 waits for a request from the remote device 200 to change the local device's transmitter settings.

In block B414, the state machine 222 determines if the request from the remote device 200 has been received. If not, then the process loops back. If yes, then in block B416, the local device 210 (i.e. state machine 222) determines if forced local coefficients are to be used. This may be determined based on a configuration setting for each lane of link 115. If forced coefficients are not to be used, then the process moves to block B418, when the local device 210 determines if the request is valid. If the request is not valid, then the process moves to block B422 described below.

If the remote request is valid, then in block B420A, the local device 210 changes its settings to the remote device's Preset/Coefficient settings. The local device 210 also sends Preset/Coefficients to the remote device in block B420B without a rejection.

If the request is not valid, then in block B422A, the local device's setting is not changed and in block B422B, the local device 210 sends the received invalid Preset/Coefficient settings to the remote device 200 with a reject message.

If forced local coefficients are enabled as determined in block B416, the process moves to block B424A, when the local device 210 transmitter settings are not changed from an initial setting that may be based on forced local coefficients. In block B424B, if the remote device 200 made a Preset request, then the received Preset request is sent back to the remote device 200 along with the forced coefficients from register 218. If the remote device 200 made a request using Coefficient, then in block B424C, the last used Preset is sent back to the remote device along with the received Coefficients. Thereafter, the process ends.

In one embodiment, the use of forced coefficients allows a local and remote device to have more precise transmitter settings instead of presets. For links that are not achieving good equalization results, the forced coefficients can be used to improve link performance.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented, method for performing an equalization process between a remote PCI (Peripheral Component Interface)-Express device and a local PCI-Express device communicating using a plurality of lanes, comprising:
   enabling use of a forced coefficient in a third phase of the equalization process at the local PCI-Express device;
   using the forced coefficient for a transmitter of the local PCI-Express device; and
   when the remote PCI-Express has made a preset request, then the local PCI-Express device sends the preset request back to the remote PCI-Express device with the forced coefficient for use by the remote PCI-Express, wherein the forced coefficient is used selectively for one of the plurality of lanes while default transmitter settings are used for another lane from among the plurality of lanes.

2. The method of claim 1, wherein the remote PCI-Express device is an adapter interface at a host computing system.

3. The method of claim 2, wherein the local PCI-Express device is a host interface at an adapter interfacing with the host computing system via a PCI-Express link.

4. The method of claim 3, wherein the adapter is a network interface card.

5. The method of claim 3, wherein the adapter is a host bus adapter.

6. The method of claim 3, wherein the adapter is a converged network adapter that can process storage traffic and network traffic.

7. A machine implemented, method for performing an equalization process between a remote PCI (Peripheral Component Interface)-Express device and a local PCI-Express device communicating using a plurality of lanes, comprising:
   storing a forced coefficient value at the local PCI-Express device;
   configuring the local PCI-Express device for enabling use of a forced coefficient in a third phase of the equalization process;
   using the forced coefficient for a transmitter of the local PCI-Express device; and
   when the remote PCI-Express has made a preset request, then the local PCI-Express device sends the preset request back to the remote PCI-Express device with the forced coefficient; wherein the forced coefficient is used selectively for one of the plurality of lanes while default transmitter settings are used for another lane from among the plurality of lanes.

8. The method of claim 7, wherein the remote PCI-Express device is an adapter interface at a host computing system.

9. The method of claim 8, wherein the local PCI-Express device is a host interface at an adapter interfacing with the host computing system via a PCI-Express link.

10. The method of claim 9, wherein the adapter is a network interface card.

11. The method of claim 9, wherein the adapter is a host bus adapter.

12. The method of claim 9, wherein the adapter is a converged network adapter that can process storage traffic and network traffic.

13. A system comprising:
   a remote PCI (Peripheral Component Interface)-Express device and a local PCI-Express device communicating via a plurality of PCI-Express links;
   wherein the local PCI-Express devices stores a forced coefficient value for an equalization process and is configured for enabling use of the forced coefficient in a third phase of the equalization process; and
   wherein the forced coefficient is used for a transmitter of the local PCI-Express device; and when the remote PCI-Express has made a previous preset request, then the local PCI-Express device sends the preset request back to the remote PCI-Express device with the forced coefficient; wherein the forced coefficient is used selectively for one of the plurality of PCI-Express links while default transmitter settings are used for another PCI-Express link.

14. The system of claim 13, wherein the remote PCI-Express device is an adapter interface at a host computing system.

15. The system of claim 13, wherein the local PCI-Express device is a host interface at an adapter interfacing with the host computing system via the PCI-Express link.

16. The system of claim 15, wherein the adapter is a network interface card.

17. The system of claim 15, wherein the adapter is a host bus adapter.

18. The system of claim 15, wherein the adapter is a converged network adapter that can process storage traffic and network traffic.

19. The system of claim 13, wherein the forced coefficient is stored at a register location of the local PCI-Express device.

20. The system of claim 13, wherein a local state machine manages the equalization process for the local PCI-Express device.

* * * * *